Figure 1:
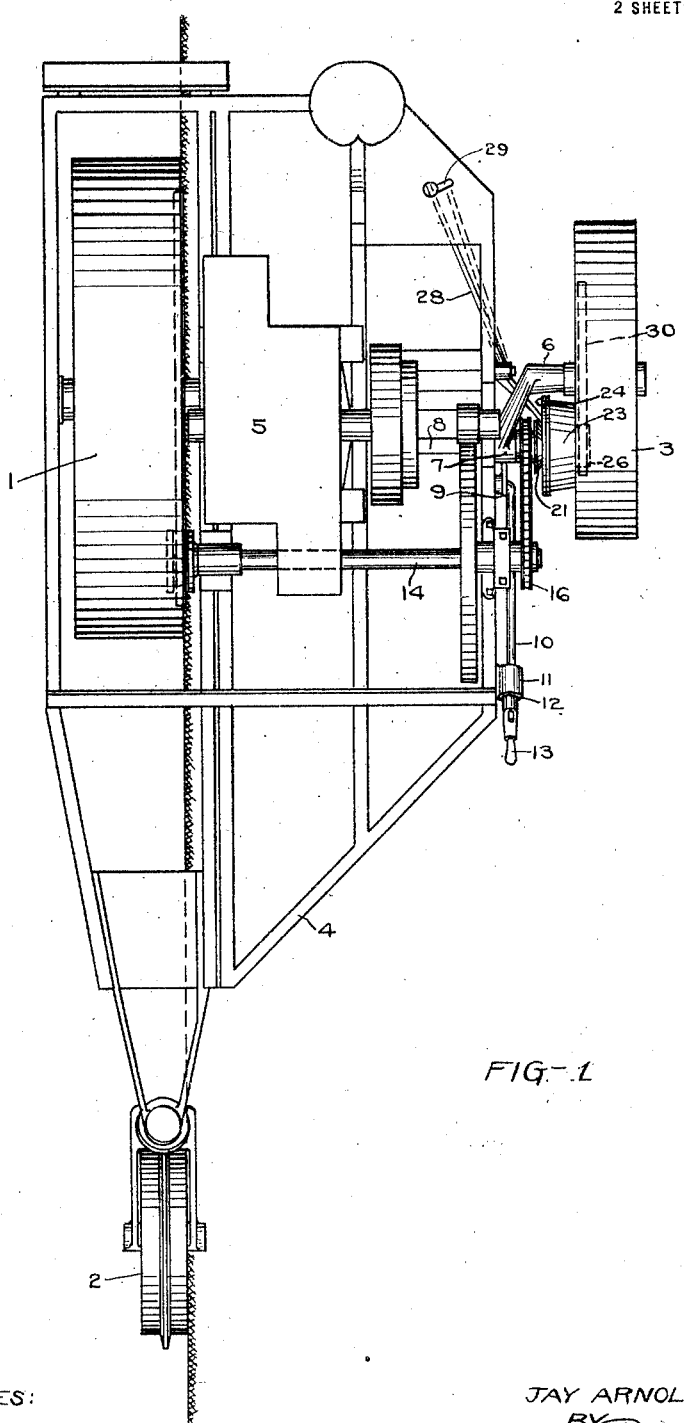

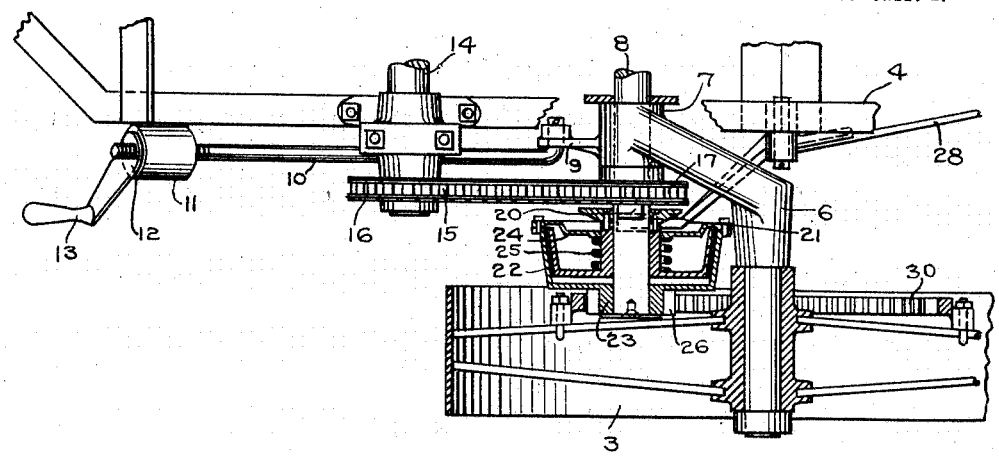
FIG.-2
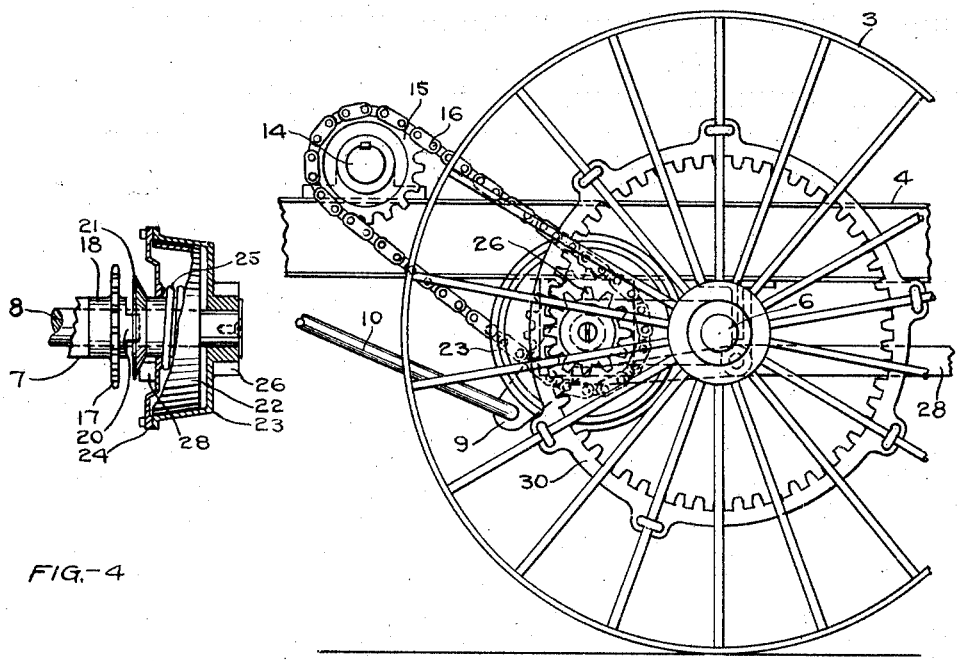
FIG.-4
FIG.-3

UNITED STATES PATENT OFFICE.

JAY ARNOLD SKARNES, OF MINNEAPOLIS, MINNESOTA, ASSIGNOR TO BULL TRACTOR COMPANY, OF MINNEAPOLIS, MINNESOTA.

TRACTOR.

1,372,321.   Specification of Letters Patent.   Patented Mar. 22, 1921.

Application filed July 25, 1917. Serial No. 182,649.

*To all whom it may concern:*

Be it known that I, JAY ARNOLD SKARNES, a citizen of the United States, and resident of Minneapolis, in the county of Hennepin and State of Minnesota, have invented certain Improvements in Tractors, of which the following is a specification.

This invention relates to improvements in tractors designed for general farm use, and particularly to improvements in the type of small tractors that are capable of being used for plowing, with, usually, not to exceed three plow bottoms, and also capable of being used for many other purposes upon a farm.

The object of my invention is particularly to improve the tractor illustrated and described in Patent No. 1,128,246, dated February 9, 1915, and issued to Bull Tractor Company, a corporation of Minnesota, as assignee of D. Maurice Hartsough.

The invention consists generally in the constructions and combinations hereinafter described and particularly pointed out in the claims.

In the accompanying drawings forming part of this specification,

Figure 1 is a plan view of a Hartsough tractor, now generally known as a Bull tractor, with my invention applied thereto, Fig. 2 is a partial horizontal plan section of the same, Fig. 3 is a side elevation of the supporting or land wheel and parts for driving the same, Fig. 4 is detail section of the spring actuated clutch by which the land wheel is driven.

The well known Bull tractor, constructed under the Hartsough patent hereinbefore specified, is provided with a single traction wheel 1, a steering wheel 2, located directly in line with the traction wheel, a supporting or land wheel 3, a suitable frame 4, and an engine or motor 5. The steering wheel 2 is preferably located in front of and in line with the single traction wheel 1. If preferred this wheel may be located in the rear of the traction wheel. The bottoms of the wheels 1 and 2 are, preferably, upon the same horizontal plane or level so that both of these wheels are adapted to travel in the same previously formed furrow.

The plows or other implements that are to be operated by the tractor are preferably hitched to the rear of the tractor frame.

The wheel 2, as described in said Hartsough patent, automatically steers the tractor, and it may be controlled by a suitable steering rod from the operator's seat. I have not in this application shown the means for controlling the steering wheel. I may employ substantially the means that is shown in the said Hartsough patent.

The supporting or land wheel 3 is mounted upon a crank axle 6, the hub portion 7 being in the form of a sleeve from which the crank extends. This sleeve is mounted upon a shaft 8, as indicated clearly in Fig. 2 of the drawings. The sleeve 7 is provided with an arm 9 to which is connected a rod 10. This rod runs through a bearing 11 in which is provided a nut 12 having a crank handle 13. By means of the crank handle 13 and nut 12 the rod 10 may be moved lengthwise in either direction, and thereby the arm 9 of the sleeve 7 may be moved back and forth oscillating said sleeve upon its axis and moving the outer end of the axle 6 up or down as may be desired. By this means the wheel 3 may be raised or lowered, thus adapting said wheel to travel at a higher or lower level. This is of especial advantage in a farm tractor, as, when plowing, the land wheel may be run at a higher level upon the unplowed ground while the tractor wheel and the steering wheel both run at a lower level on the bottom of the last previously formed furrow. With this arrangement the tractor runs substantially level when plowing. When it is desired to use the tractor for other farm purposes, such as harrowing, seeding and harvesting, the crank 13 may be turned so as to rock the sleeve 7 and crank shaft 6, and thereby to raise or lower the land wheel 2. Both wheels may then be brought to the same level and the tractor may be used upon highways, for harrowing or seeding, for harvesting, or other purposes.

It will be noted that this Bull or Hartsough tractor has the entire driving power applied to its single traction wheel. I have found that with this arrangement the supporting wheel will at times drop into a recess or hole in the ground, or will come against an obstruction, and the machine be swung to one side and thrown out of its line of travel. At other times this arrangement tends to produce too much side draft.

I have remedied these objections by providing means for positively driving the land wheel under such circumstances while permitting the same when desired to operate as an idle wheel.

As here shown the shaft 14 is positively driven from the engine or motor. Through this shaft the Bull or driving wheel 1 is operated, as illustrated in Fig. 1 of the drawings. The shaft 14 is provided with a suitable sprocket 15, and this sprocket is engaged by a sprocket or driving chain 16. This chain also engages a sprocket wheel 17 mounted loosely by a hub 18 upon the stub shaft 8. The face of the wheel 17 is provided with projections 20 adapted to engage corresponding recesses in a driving sleeve 21. This sleeve is arranged to slide freely upon the shaft 8, and it carries with it a friction clutch member 22 which rotates with said wheel 21 upon the shaft 8. Loosely mounted on said shaft 8 is a friction clutch member 23 provided with a retaining plate 24. The clutch member 22 which is preferably formed integrally with the sleeve 21 is arranged to engage the opposing surface of the clutch member 23, as indicated in Fig. 4 of the drawings. A spring 25 is preferably arranged within the clutch member 22, and one end of said spring bears against the plate 24. This spring normally tends to hold the clutch members 22 and 23 in close or driving contact with each other. The clutch member 23 has preferably formed integrally and concentric therewith a pinion or gear 26, which meshes with a ring gear 30 secured to the land wheel 3.

Ordinarily the spring 25 holds the clutch member 22 in driving contact with the inner surface of the clutch member 23, as indicated in Fig. 4 of the drawings. The arrangement of the sleeve 21 permits a longitudinal movement of said sleeve, and of the member of the friction clutch that is connected thereto without disturbing the operation of the other parts of the mechanism. The spring 25 ordinarily holds the two members of the friction clutch in contact with each other with sufficient force so that the two members will rotate together, and the land wheel will be driven, while permitting some slipping action when the land wheel meets an excessive resistance.

A foot lever 28 is arranged in proximity to the driver's seat and it is provided with a projecting end that engages the sleeve 21 (see Figs. 2 and 4), and also preferably with a catch 29 (see Fig. 1) for locking it when moved to separate the clutch mechanism. By this means the opposing members of the clutch may be separated when desired, the movable member being carried by the foot lever 28 out of contact with the inner surface of the other member against the tension of the spring 25. When so moved the land wheel will run idly instead of being driven from the engine or motor of the machine.

When the tractor is used for purposes other than plowing the two wheels may be brought onto the same level and both wheels may be positively driven through the means described.

It will be understood that when the tractor is used for plowing, the traction wheel and the steering wheel travel in the same furrow, and the steering wheel, which in operation is turned at a slight angle to the upright wall of the furrow, hugs said wall and will thereby automatically steer the tractor. If, however, the steering wheel at any time begins to ride out of the furrow so that a continued positive drive of both wheels would tend to cause it to leave the furrow, the friction driving connection of the land wheel will slip to such an extent as may be necessary to prevent the steering wheel from leaving the furrow.

With this construction I am able therefore to provide a drive for the land wheel, which will not interfere with the automatic guiding of the tractor by the steering wheel running in the furrow, as the power applied to the land wheel will be varied responsively to the lateral stress upon the steering wheel.

The details of construction may be varied in many particulars without departing from my invention.

I claim as my invention:

1. In a tractor, the combination with a supporting frame, of a traction wheel and a steering wheel arranged in alinement therewith, said traction and steering wheels being adapted to run in the same furrow when the tractor is used for plowing, an offset supporting wheel, a motor mounted upon said frame for driving said traction wheel, and a friction controlled drive between said motor and said supporting wheel, whereby the power applied to said supporting wheel may be varied responsively to the lateral stress upon the steering wheel.

2. In a tractor, the combination with a supporting frame, of a traction wheel and a steering wheel arranged in alinement therewith, said traction and steering wheels being adapted to run in the same furrow when the tractor is used for plowing, an offset supporting wheel, a motor mounted upon said frame for driving said traction wheel, and friction controlled means for applying power from said motor to drive said supporting wheel, whereby the speed of the supporting wheel may be varied responsively to the lateral stress upon the steering wheel to permit said steering wheel to automatically guide the tractor.

3. In a tractor, the combination with a supporting frame, of a traction wheel and a steering wheel arranged in alinement therewith, said traction and steering wheels being adapted to run in the same furrow when the tractor is used for plowing, an offset supporting wheel, a motor mounted upon said frame for driving said traction wheel, a friction controlled drive between said motor and said supporting wheel, and means for disconnecting said drive, whereby the power applied to said supporting wheel may be varied responsively to the lateral stress upon the steering wheel or may be disconnected therefrom to permit said supporting wheel to run idle.

In witness whereof I have hereunto set my hand this 11th day of July, 1917.

JAY ARNOLD SKARNES.

Witnesses:
H. M. FEROE,
C. H. REHFUSS.